United States Patent
Tranchero

(10) Patent No.: US 11,427,445 B2
(45) Date of Patent: Aug. 30, 2022

(54) CRANE COMPRISING A STEERING SYSTEM

(71) Applicant: Jacques Tranchero, Costigliole Saluzzo (IT)

(72) Inventor: Jacques Tranchero, Costigliole Saluzzo (IT)

(*) Notice: Subject to any disclaimer, the term of this patent is extended or adjusted under 35 U.S.C. 154(b) by 94 days.

(21) Appl. No.: 16/772,702

(22) PCT Filed: Dec. 10, 2018

(86) PCT No.: PCT/IB2018/059813
§ 371 (c)(1),
(2) Date: Jun. 12, 2020

(87) PCT Pub. No.: WO2019/116192
PCT Pub. Date: Jun. 20, 2019

(65) Prior Publication Data
US 2021/0163271 A1     Jun. 3, 2021

(30) Foreign Application Priority Data
Dec. 11, 2017 (IT) .......................... 102017000142070

(51) Int. Cl.
*B66C 23/36* (2006.01)
*B62D 7/08* (2006.01)
(Continued)

(52) U.S. Cl.
CPC ................ *B66C 23/36* (2013.01); *B62D 7/08* (2013.01); *B66C 23/62* (2013.01); *B66C 2700/0378* (2013.01)

(58) Field of Classification Search
CPC ......... B66C 23/18; B66C 23/36; B66C 23/62; B66C 2700/0378; B62D 7/08; B62D 7/10;
(Continued)

(56) References Cited

U.S. PATENT DOCUMENTS

RE29,849 E  * 11/1978 Quigniot ................. B62D 13/04
                                                         280/124.157
2006/0220335 A1* 10/2006 Damm .............. B60G 17/01908
                                                          280/86.757
(Continued)

FOREIGN PATENT DOCUMENTS

CN       1434785 A  *  8/2003  ........... B62D 7/1509
CN     113135220 A  *  7/2021  ........... B60B 35/003
(Continued)

OTHER PUBLICATIONS

Description Translation for EP 0143861 from Espacenet (Year: 1985).*
(Continued)

*Primary Examiner* — James A English
*Assistant Examiner* — Daniel M. Keck
(74) *Attorney, Agent, or Firm* — Merchant & Gould P.C.

(57) ABSTRACT

A crane for lifting and transporting loads includes a base frame, for transferring the loads of the crane onto a support surface by a plurality of wheels having two steering wheels; and a steering system. The steering system includes a linear steering actuator, which is hinged, on one side, to the base frame and, on the other side, to a bar having two ends. Each end of the bar is hinged to a respective rotary element around a respective hinging axis. Each rotary element rotates around a respective rotation axis and is constrained in rotation to the respective steering wheel to steer it.

10 Claims, 7 Drawing Sheets

(51) Int. Cl.
  *B66C 23/62* (2006.01)
  *B66F 9/075* (2006.01)
  *B60G 3/00* (2006.01)
(58) Field of Classification Search
  CPC ........ B62D 7/12; B62D 7/09; B60G 2200/44;
    B60G 2200/46; B60G 2202/413; B60G
    2300/06; B60G 2400/823; B60G
    2800/019; B60G 3/00; B60G 17/0165;
    B60G 17/017; B66F 9/07568
  See application file for complete search history.

(56) References Cited

U.S. PATENT DOCUMENTS

| | | | | |
|---|---|---|---|---|
| 2011/0089657 | A1* | 4/2011 | Shibuya | B62D 7/20 |
| | | | | 280/93.512 |
| 2018/0229695 | A1* | 8/2018 | Pettersson | B66C 23/62 |

FOREIGN PATENT DOCUMENTS

| | | | | |
|---|---|---|---|---|
| DE | 102014000236 A1 | * | 7/2015 | ............... B62D 5/06 |
| DE | 102020117640 A1 | * | 1/2022 | |
| EP | 0143861 A1 | | 6/1985 | |
| EP | 1914140 A1 | | 4/2008 | |
| FR | 2862937 A1 | * | 6/2005 | ........... B62D 5/0442 |
| GB | 2362863 A | | 12/2001 | |

OTHER PUBLICATIONS

Description Translation for EP 1914140 from Espacenet (Year: 2008).*
International Search Report and Written Opinion from International Application No. PCT/IB2018/059813, dated Mar. 18, 2019.

* cited by examiner

CRANE COMPRISING A STEERING SYSTEM

This application is a National Stage Application of International Application No. PCT/IB2018/059813, filed Dec. 10, 2018, which claims benefit of Serial No. 102017000142070, filed Dec. 11, 2017 in Italy and which applications are incorporated herein by reference. To the extent appropriate, a claim of priority is made to each of the above-disclosed applications.

TECHNICAL FIELD

The invention relates to a crane on wheels for lifting and moving loads.

TECHNOLOGICAL BACKGROUND

In the industrial field, as well as in the craft industry, the need to pick up, move and position loads at substantial distances from the pick-up point is well known. Furthermore, the crane has to be able to move on the ground within small spaces. Finally, the friction between the wheels and the ground during the steering of the crane must be reduced.

SUMMARY OF THE INVENTION

An object of the invention is to provide a crane for lifting and moving loads, which is able to solve this and other drawbacks of the prior art and which, at the same time, can be produced in a simple and economic way.

In particular, one of the technical problems solved by the invention is that of providing a crane for lifting and moving loads, which is capable of ensuring a small steering radius by means of a simple steering system.

The appended claims are an integral part of the technical teaches provided in the following detailed description concerning the invention.

BRIEF DESCRIPTION OF THE DRAWINGS

Further features and advantages of the invention will be best understood upon perusal of the following detailed description, which is provided by way of example and is not limiting, with reference, in particular, to the accompanying drawings, wherein.

DETAILED DESCRIPTION OF THE INVENTION

Figure 1A:
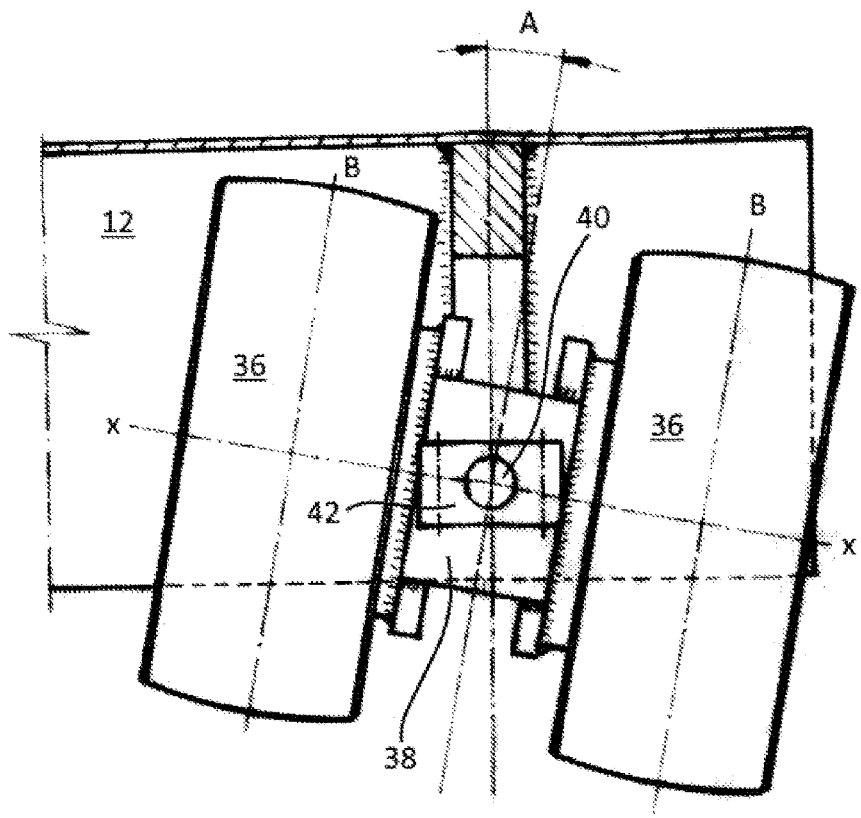
FIG. 1a is a front view of a pair of twin wheels with a variable camber angle, according to an embodiment of the invention.

With reference to the accompanying figures, number 10 indicates, as a whole, a crane for lifting and moving loads comprising: a base frame 12, for transferring the loads of crane 10 onto a support surface by means of a plurality of wheels 34, 35, 36. In particular, at least one wheel 34, 35, 36 is capable of rotating relative to said base frame 12 so as to change the camber angle A of said wheel.

Therefore, at least one wheel 34, 35, 36 (which can be a drive wheel or a driven wheel) is capable of rotating relative to base frame 12 so as to change camber angle A. Hence, with particular reference to FIGS. 1a-c, wheel 36 can rotate around a camber axis y-y of said wheel 36. Camber axis y-y of the wheel can also be meant as a roll axis of the wheel. In particular, camber axis y-y is perpendicular to rolling axis x-x of wheel 36. When the crane is on a horizontal support surface, camber axis y-y preferably is horizontal. Through the rotation around camber axis y-y, the wheel can change its camber angle A. According to the description below, FIGS. 1a-c relate, in a non-limiting manner, to a pair of twin wheels 36.

A return means, such as an elastic means (for example, a spring), preferably tends to move wheel 34, 35, 36 to a position in which camber angle A is equal to zero. For instance, when the crane is on a horizontal support surface, the return means tends to move wheel 34, 35, 36 to a vertical position (in which camber angle A is equal to zero). This solution allows wheels 34, 35, 36 to have a better traction, adjusting to the irregularities of the ground. A further advantage lies in the fact that wheel 34, 35, 36 with a variable camber angle A damages the floor on which it is going to lean to a smaller extent.

For example, some wheels 34, 36 are drive wheel and the other wheels 35 are driven wheels. In the example (FIGS. 2-5) there are four wheels 34, 35, in particular arranged at the vertexes of a rectangle in plan view. Conveniently, one or more wheels 34 are steering wheels. In the example there are two steering wheels 34 and two fixed wheels 35 (i.e. non-steering wheels).

Preferably, a plurality of wheels 34, 35, 36 are capable of rotating relative to said base frame 12 so as to change camber angle A of said wheels. Optionally, all wheels 34, 35, 36 are capable of changing camber angle A. Preferably, the wheel can assume a negative and/or positive camber angle A. In the example shown herein, there are four wheels 34, 35 and two wheels 34 can change their camber angle A.

Preferably, at least one wheel 34, which is capable of changing its camber angle A, is a drive wheel. Preferably, at least one wheels 34 are dive wheels. According to a particular variant, wheels 34, which are capable of changing their camber angle A, are drive wheels. With reference to the variant shown herein, the two wheels 34 are also drive wheels. Optionally, all wheels are drive wheels; therefore, the crane is provided with a four-wheel drive or six-wheel drive system.

According to a variant of the invention, drive wheels 34, 35, 36 are provided with respective motors 37, preferably electric or hydraulic motors. Motor 37 of each drive wheel preferably acts independently of the other ones. Hence, the crane comprises at least one motor 37 associated with a respective drive wheel and configured to operate it causing the rolling thereof (i.e. rotation around axis x-x, with reference to FIGS. 1a-c).

Figure 1B:
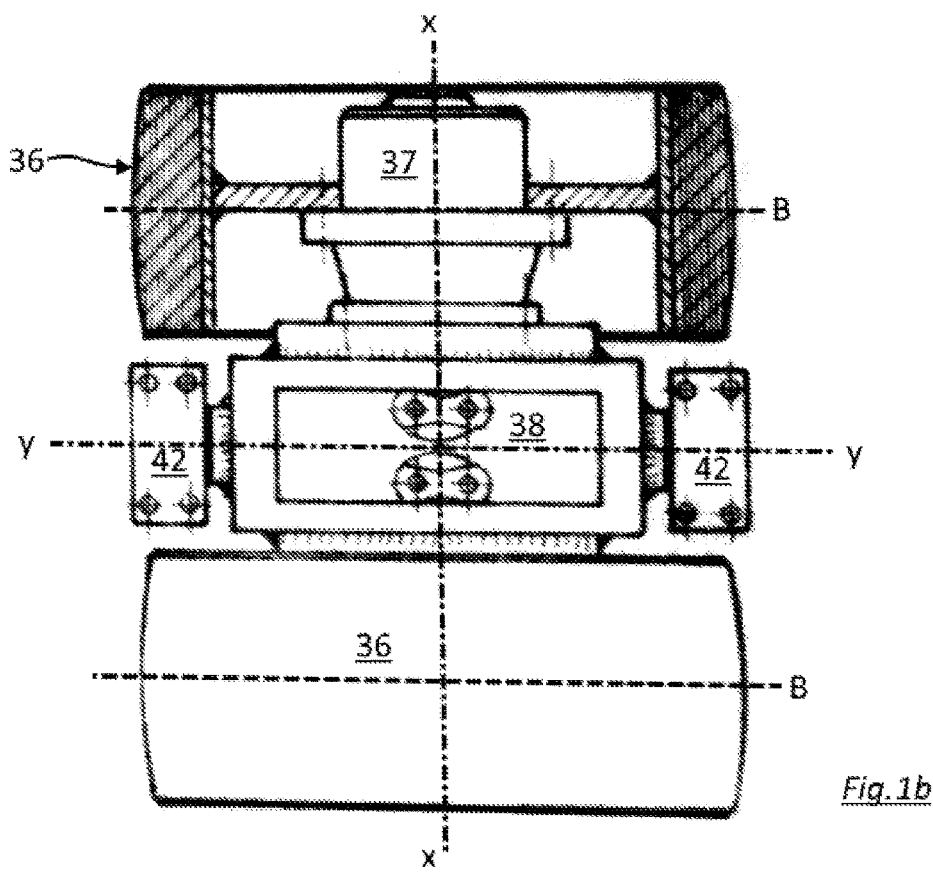
FIG. 1b is a plan view of the pair of twin wheels of FIG. 1a, wherein one wheel is sectioned.
Figure 1C:
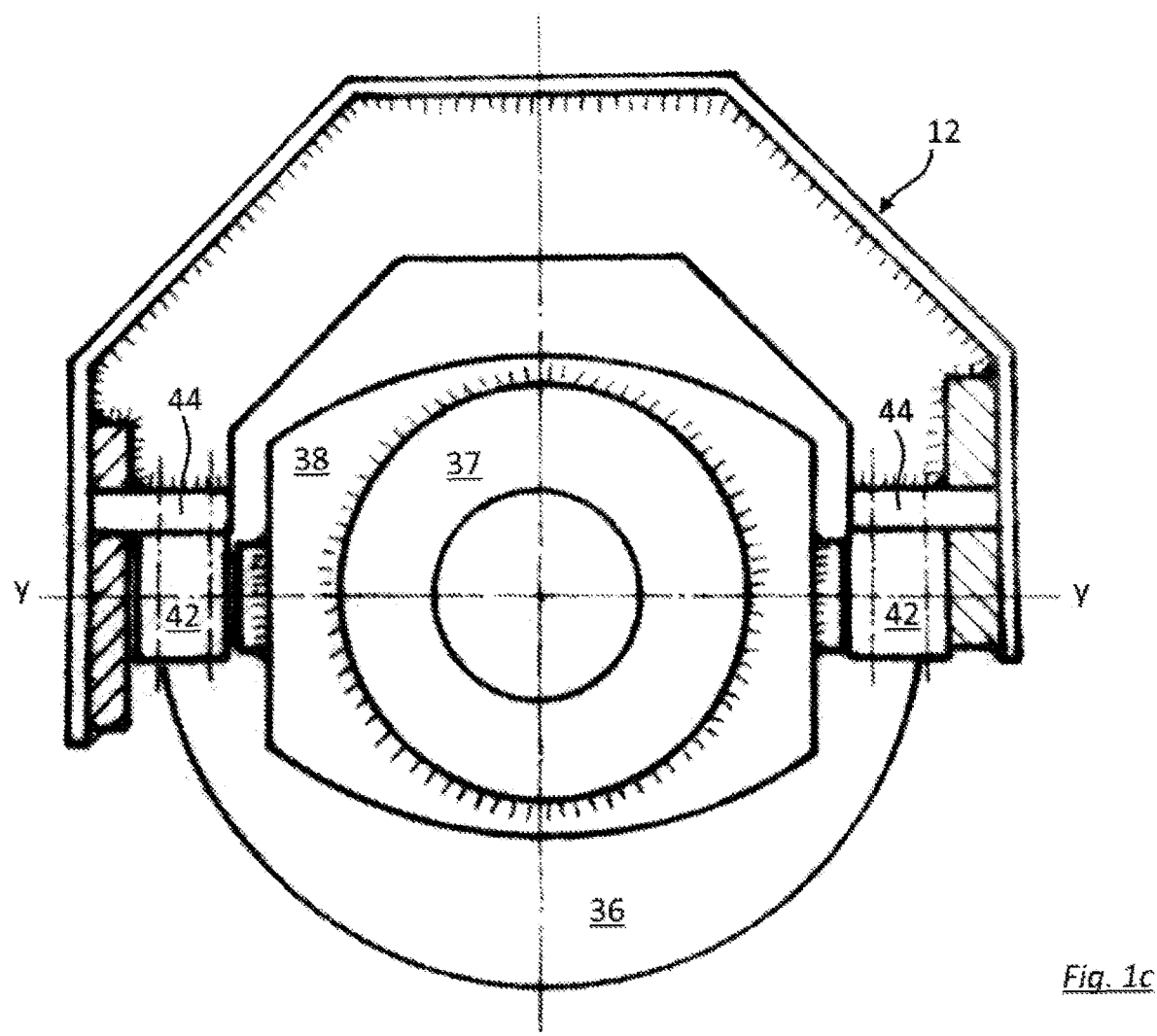
FIG. 1c is a side view of the pair of twin wheels of FIG. 1a, wherein one wheel is missing for a better understanding.

According to the variant of FIGS. 1a-c, the crane comprises at least one pair of twin wheels 36, which are capable of rotating relative to said base frame 12 so as to change camber angle A of said twin wheels 36. According to a variant of the invention, twin wheels 36 are adapted to rotate around rolling axis x-x independently of one another, but they assume the same camber angle A. This solution also allows a reduction of the torque needed to steer on the support surface, in particular in case twin wheels 36 are configured to steer. Indeed, when the weight of crane and of the load is considerable, there is a great sliding friction between the wheel and the support surface, which makes it difficult for the steering wheels to be steered. Alternatively, twin wheels 36 are integral in their rotation around rolling axis x-x.

Preferably, at least one pair of twin wheels 36 is adapted to be operated by a respective motor 37 associated with said pair. In particular, there are different pairs of twin wheels 36 and each pair is adapted to be operated by a respective motor 37. Motors 37 can act in an independent manner, conveniently coordinated by a control unit.

Preferably, with particular reference to FIGS. 2-5, at least one wheel 34 is a steering wheel; in particular, there are different steering wheels, which, in the example shown herein, are rear wheels 34. With reference to the variant shown by way of example, steering wheels 34 are driven wheels (or free wheels). In the example shown by way of example, the two wheels 34 are steering and driven wheels. Alternatively, steering wheels 34 are also drive wheels. According to a further possible variant, steering wheels 34 are drive wheels and they are also capable of rotating relative to base frame 12 so as to change their camber angle A.

Hence, according to possible variants of the invention, the wheel (single wheel 34, 35 or twin wheel 36) with a variable camber angle can be a non-steering wheel, a steering wheel, a drive wheel or a driven wheel.

With reference to the details of FIGS. 1a-c, there is a support element 38, which supports twin wheels 36 (with freedom of rotation around rolling axis x-x) and is fixed in a rotary manner to base frame 12 (only a portion thereof is shown). The rotation of support element 38 allows camber angle A of twin wheels 36 to be changed. In the example shown herein, support element 38 is interposed between the two twin wheels 36. In particular, support element 38 comprises a pin 40, which is integral to it and can rotate relative to base frame 12. In particular, pin 40 is inserted, with freedom to rotate, in a housing portion 42, which is fixed in a removable manner (for example, through bolts) to base frame 12, for instance to a bracket 44, which is fixed to base frame 12. In FIG. 1c, y-y indicates the camber axis around which pin 40 and, hence, wheel 36 can rotate in order to change camber angle A. Rolling axis x-x lies on a plane that is perpendicular to camber axis y-y of twin wheels 36 and, in particular, these axes x-x and y-y are incident. According to an alternative variant, these axes x-x and y-y are not incident.

With special reference to the example of FIGS. 1 a-c, middle planes B of twin wheels 36 are spaced apart and, in particular, equally spaced apart from the camber axis y-y. Middle planes B are parallel to camber axis y-y.

Even in case of a single wheel 34, 35, a mechanism can be used to change camber angle A, as described for the case of twin wheels 36. According to possible variants, the middle plane of single wheel 34, 35 can include camber axis y-y or be spaced apart from it.

According to a particular variant, in case only some wheels 34, 35, 36 are drive wheels, the drive wheels are those wheels 34, 35, 36 that transfer the greatest force onto the support surface, when the crane carries the load. For example, the crane has four wheel assemblies, each one consisting of one single wheel 34, 36 or of twin wheels 36, and the two front wheel assemblies comprise the drive wheels. By so doing, the friction between the drive wheels and the support surface can be maximized.

Conveniently, said at least one drive wheel, having the variable camber angle, is self-braking; for example, motor 37 is self-braking. When the user interrupts the "moving" control of crane 1, said motor 37 generates a braking action in order to stop the movement of crane 10 relative to the ground as soon as possible. Motor 37 can be of a known type, namely a hydraulic or electric motor. If necessary, self-braking wheel 34, 35, 36 can also be a steering wheel.

Figure 3:
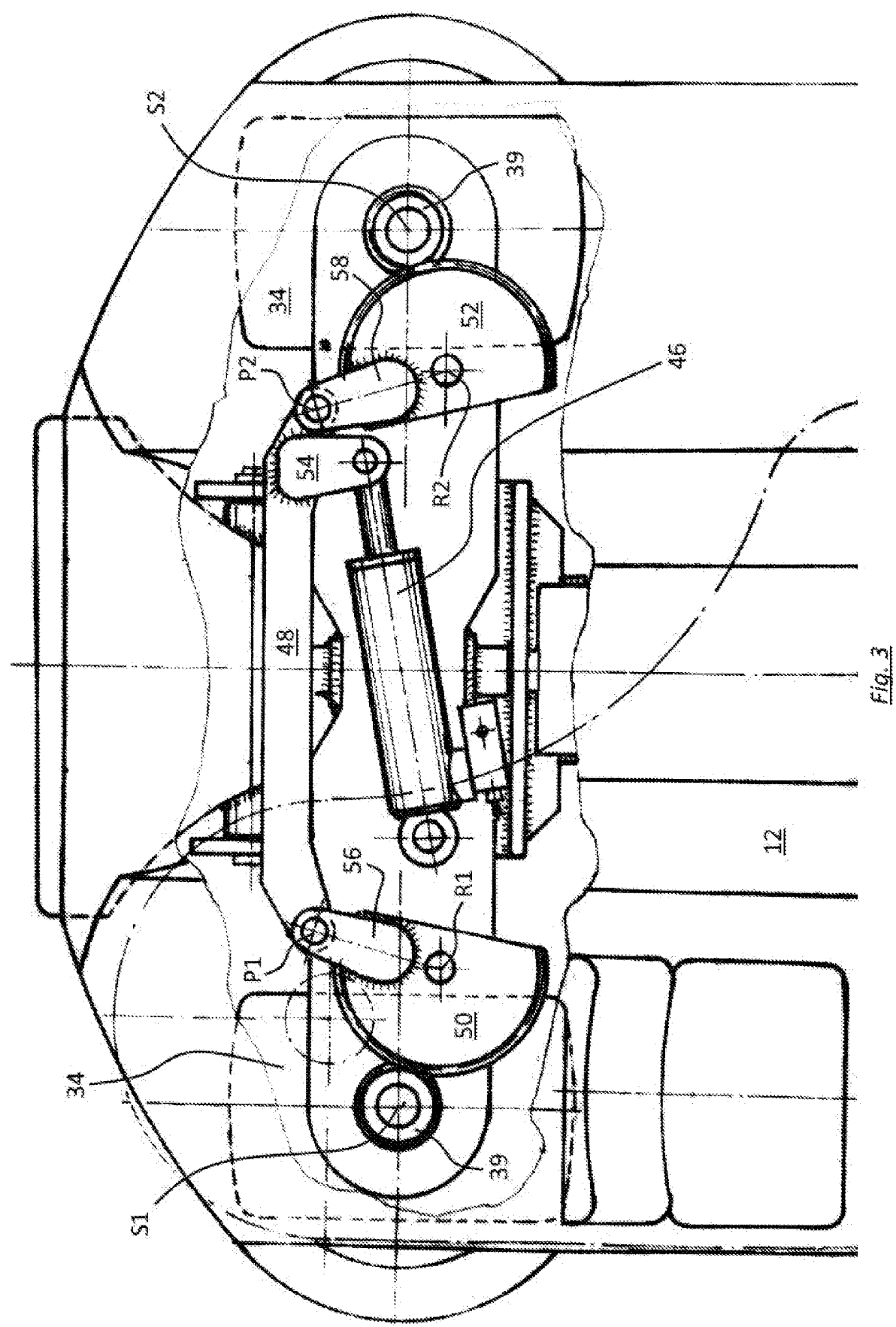
FIG. 3 is a plan view of some details of two steering wheels of the crane, according to a particular variant of the invention.
Figure 4:
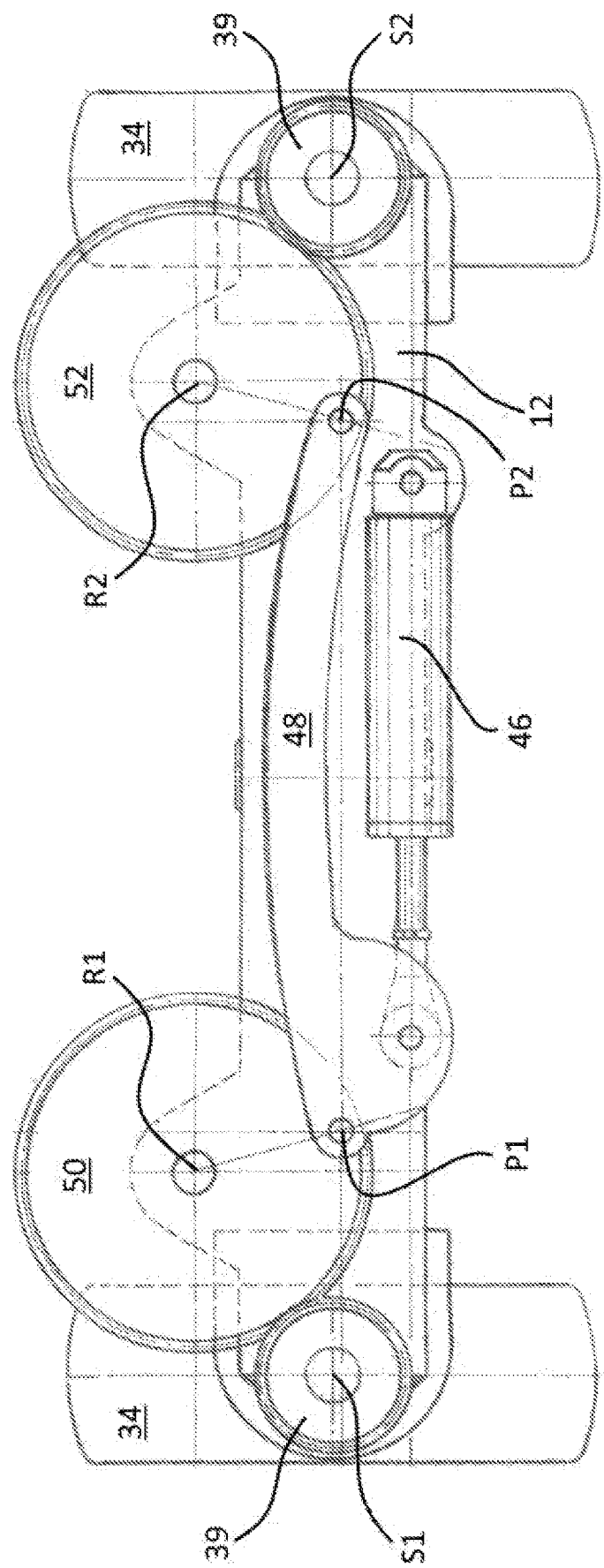
FIG. 4 is a plan view of some details of two steering wheels of the crane, according to a further variant of the invention.
Figure 5:
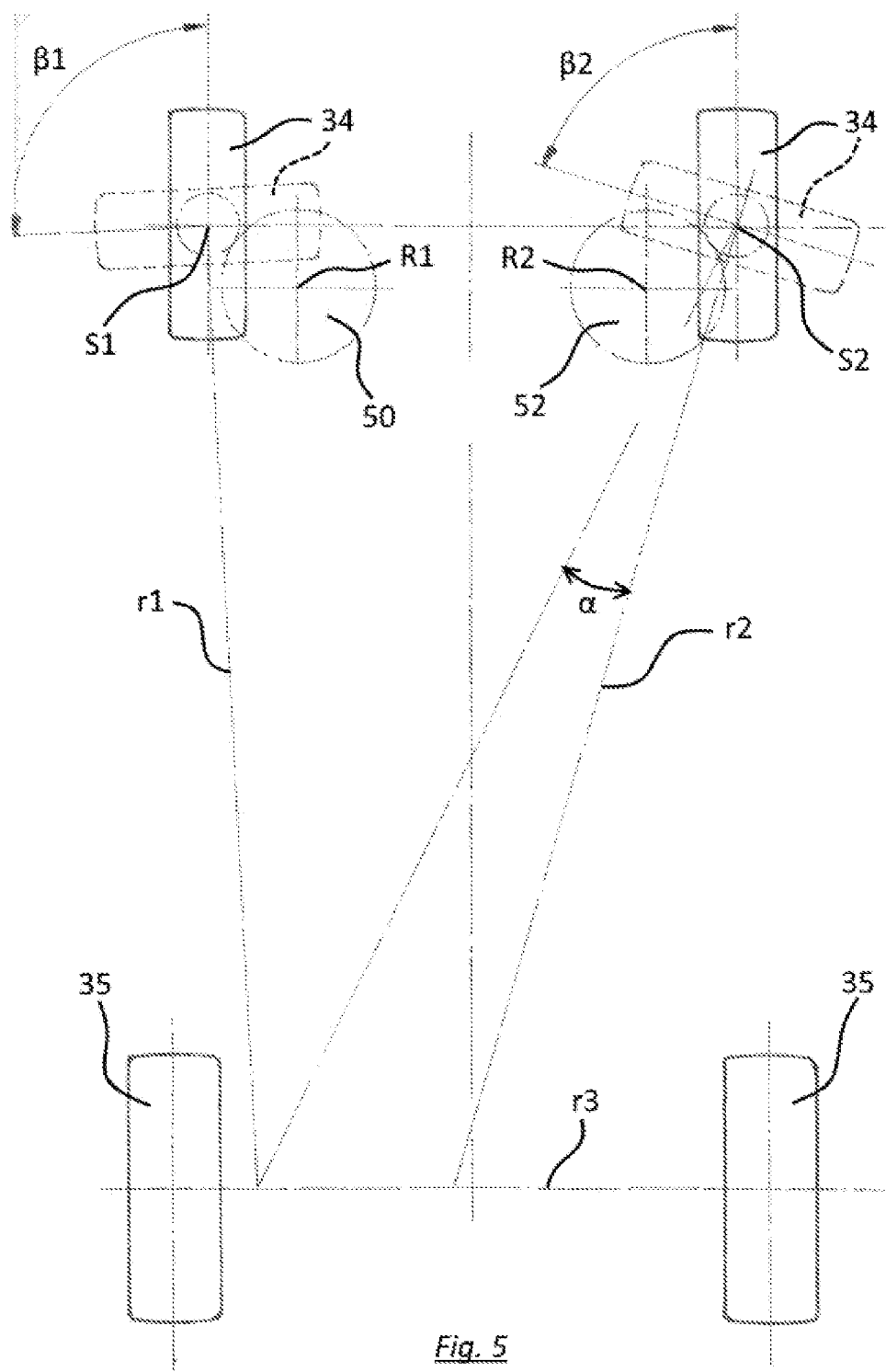
FIG. 5 is a plan view of the wheels of the crane in an operating configuration, according to a particular variant of the invention.

FIGS. 3 and 4 show two steering wheels 34, in particular rear wheels. The crane preferably comprises a steering system including a linear steering actuator 46 (for example, a hydraulic jack), which is hinged, on one side, to base frame 12 and, on the other side, to a bar 48 having two ends. Each end of bar 48 is hinged to a respective rotary element 50, 52 around a respective hinging axis P1, P2, each rotary element 50, 52 being constrained, in its rotation, to the respective wheel 34, in order to steer it. Each rotary element 50, 52 rotates around a respective rotation axis R1, R2. For example, rotary element 50, 52 is constrained, in its rotation, to respective wheel 34 by means of gears. In particular, each steering wheel 34 is integral to a respective toothed gear 39, which meshes with a toothed surface on respective rotary element 50, 52. Therefore, the rotation of rotary element 50, 52 controls the rotation of wheel 34 around a steering axis S1, S2 (which generally is vertical) of wheel 34. By way of example, rotary element 50, 52 can be a disc, or a semi-disc, or a toothed gear. The steering system advantageously allows users to facilitate the control of the steering, thus avoiding sudden movements of the crane when it is moving. A further advantage lies in the fact that steering angles $\beta 1$, $\beta 2$ assumed by steering wheels 34 are not equal to one another when they 34 are in a steered position. Hence, rolling axes r1, r2 of steering wheels 34 are not parallel to one another when they 34 are in a steered position (see FIG. 5). As person skilled in the art clearly knows, rolling axes r1, r2 correspond to axis x-x of FIGS. 1a-b. A further advantage lies in the fact that users can obtain a reduced steering radius of the crane, minimizing the friction between wheels 34 and the ground. Therefore, the crane can steer around a point that is substantially on a rolling axis r3 of non-steering wheels 35. According to FIG. 5, rolling axes r1, r2 of steering wheels 34 define a sliding angle $\alpha$, which advantageously is small or equal to zero, and, hence, the friction generated between wheels 34 and the ground is remarkably reduced.

In particular, the distance between hinging axes P1, P2 of bar 48 is smaller than the distance between rotation axes R1, R2 of rotary elements 50, 52. Rotation axes R1, R2 are parallel to steering axes S1, S2 (which conveniently are vertical) of wheels 34. Bar 48 is adapted to translate in a plane, for example a horizontal plane. Preferably, the distance between rotation axes R1, R2 of rotary elements 50, 52 is smaller than the distance between steering axes S1, S2 of wheels 34.

In particular, in FIG. 3, linear steering actuator 46 is hinged to a bracket 54, which is rigidly fixed, in particular welded, to bar 48. The ends of bar 48 are hinged to two brackets 56, 58, each bracket 56, 58 being rigidly fixed, in particular welded, to respective rotary element 50, 52.

On the contrary, in the particular variant of FIG. 4, linear steering actuator 46 is hinged to bar 48. The ends of bar 48 are hinged to the respective rotary element 50, 52; in particular, rotary element 50, 52 is a disc, and bar 48 is hinged to said disc close to the circumference of said disc.

Figure 2:
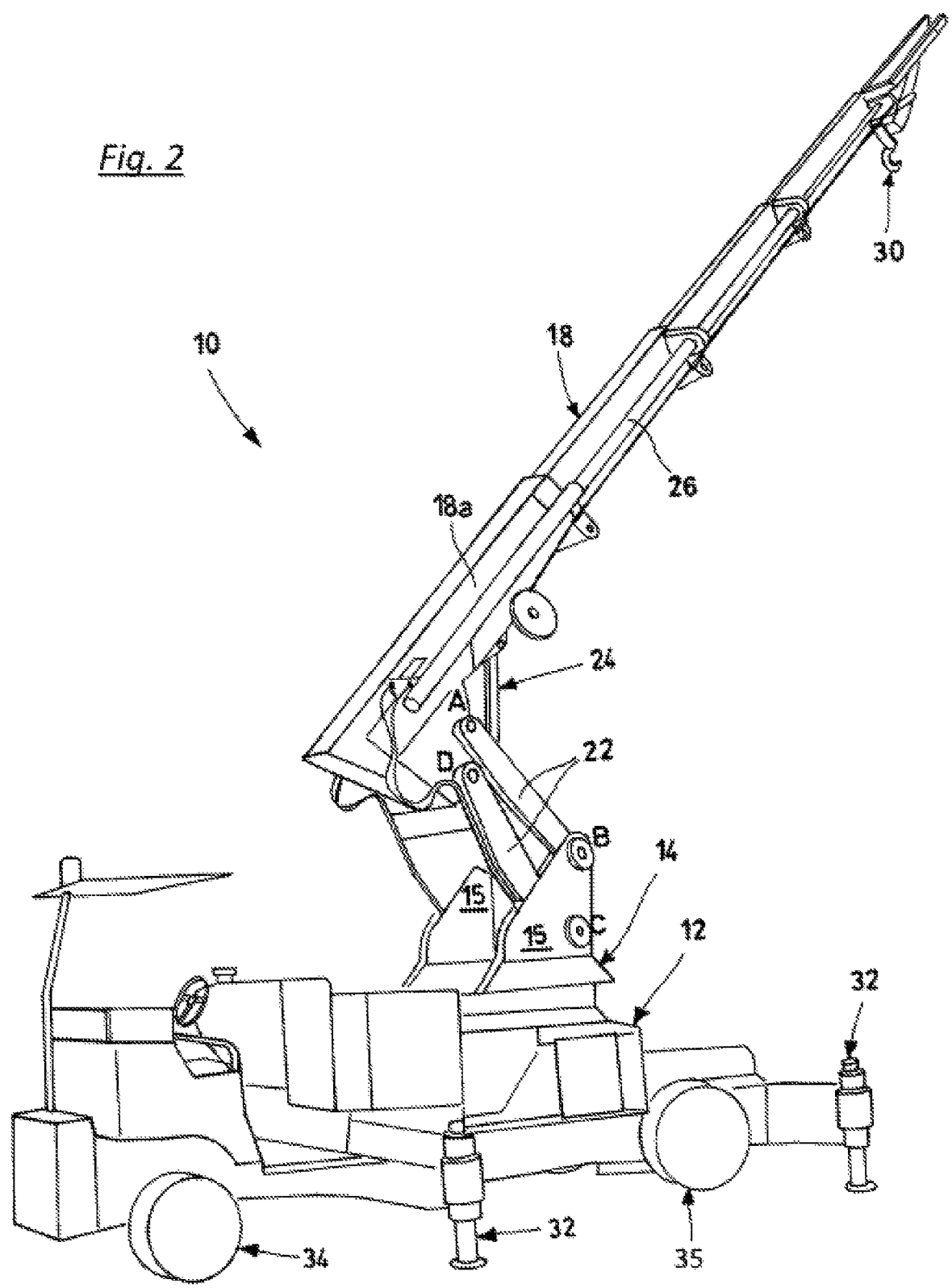
FIG. 2 is a perspective view of a crane according to a particular variant of the invention.

With reference to the variant shown, by way of non-limiting example, in FIG. 2, there is an arm 18 for lifting and transporting loads, which is capable of rotating relative to said base frame 12 around a vertical axis. Preferably, arm 18 is also, though not exclusively, capable of moving around a substantially vertical axis. Furthermore, the arm can be of a known type, for example it can be telescopic, or it can consist of different portions articulated to one another, etc.

Preferably, there are stabilizers 32, which are constrained to base frame 12 and, preferably, are extractable in a known manner. In the example there are four stabilizers 32, in particular located at the vertexes of a rectangle in plan view.

For greater clarity, a non-limiting description of a crane 10 having a particular structure and a preferred lifting mechanism is provided below. With particular reference to the variant shown, crane 10 comprises:

base frame 12;
a turret 14, which is fixed to base frame 12 so as to rotate, in particular around a substantially vertical axis,
arm 18, for moving loads and is mounted on turret 14 in a movable manner.

In particular, the crane includes a pair of connecting rod elements 22, each connecting rod element 22 being hinged to turret 14 and to arm 18, so as to create an articulated quadrilateral. There is a first linear actuator 24 fitted on turret 14 and hinged to arm 18, which is capable of causing the lifting movement of arm 18. In a non-limiting manner, FIG. 2 shows an articulated quadrilateral, which is defined by the points indicated with letters A, B, C, D.

In particular, turret 14 has a pair of brackets 15, in particular arranged vertically. A respective pair of connecting rod elements 22 pivots on each bracket 15. Therefore, there are two pairs of connecting rod elements 22, substantially arranged on the sides of arm 18.

Conveniently, arm 18 is telescopic and comprises sliding segments controlled by a second linear actuator 26. A first segment 18a is constrained to turret 14 in a movable manner and at least one further segment can slide relative to the first segment 18a. The second linear actuator 26 is adapted to perform the extraction/retraction of the segments, so as to increase/decrease the reach of arm 18. The top end of the first linear actuator 24 is hinged to the first segment 18a. Conveniently, linear actuators 24, 26, or at least one of them, are hydraulic jacks. Conveniently, at least one of linear actuators 24, 26 is a hydraulic jack with two simultaneous stages. Connecting rod elements 22 are hinged to the first segment 18a.

Preferably, arm 18 is provided with means for attaching and transporting the loads, such as, for example, a clamp, tongs, a hook 30, or a platform, etc. For example, arm 18 is associated with a winch system or a hoist, in order to move the loads. Said winch is conveniently activated by a motor means, such as an electric motor. The winch (or hoist) is associated with a hook 30, or the like, which can be extracted or retracted by operating the winch.

The control tools can comprise, for example, push-buttons, levers, screens, warning lights, sirens, indicators of different types, thus allowing the user to receive signals of various kinds regarding the operation of crane 10.

Crane 10 preferably comprises at least one electric battery, which can be of the rechargeable type or not. Conveniently, the battery is rechargeable and can be recharged without being removed from the crane through suitable battery recharging means, for example by connecting the battery recharging means to an industrial or domestic socket outlet. The battery is adapted to supply the power required to carry out one or more of the following operations: activating the linear actuators; activating the signaling devices, among which there are the acoustic and visual ones; supplying power to the control system; activating the drive wheel; etc.

According to further variants, arm 18 of crane 10 can be moved by means of a rope system, alternatively or in addition to linear actuator 24, 26.

Figure 6:
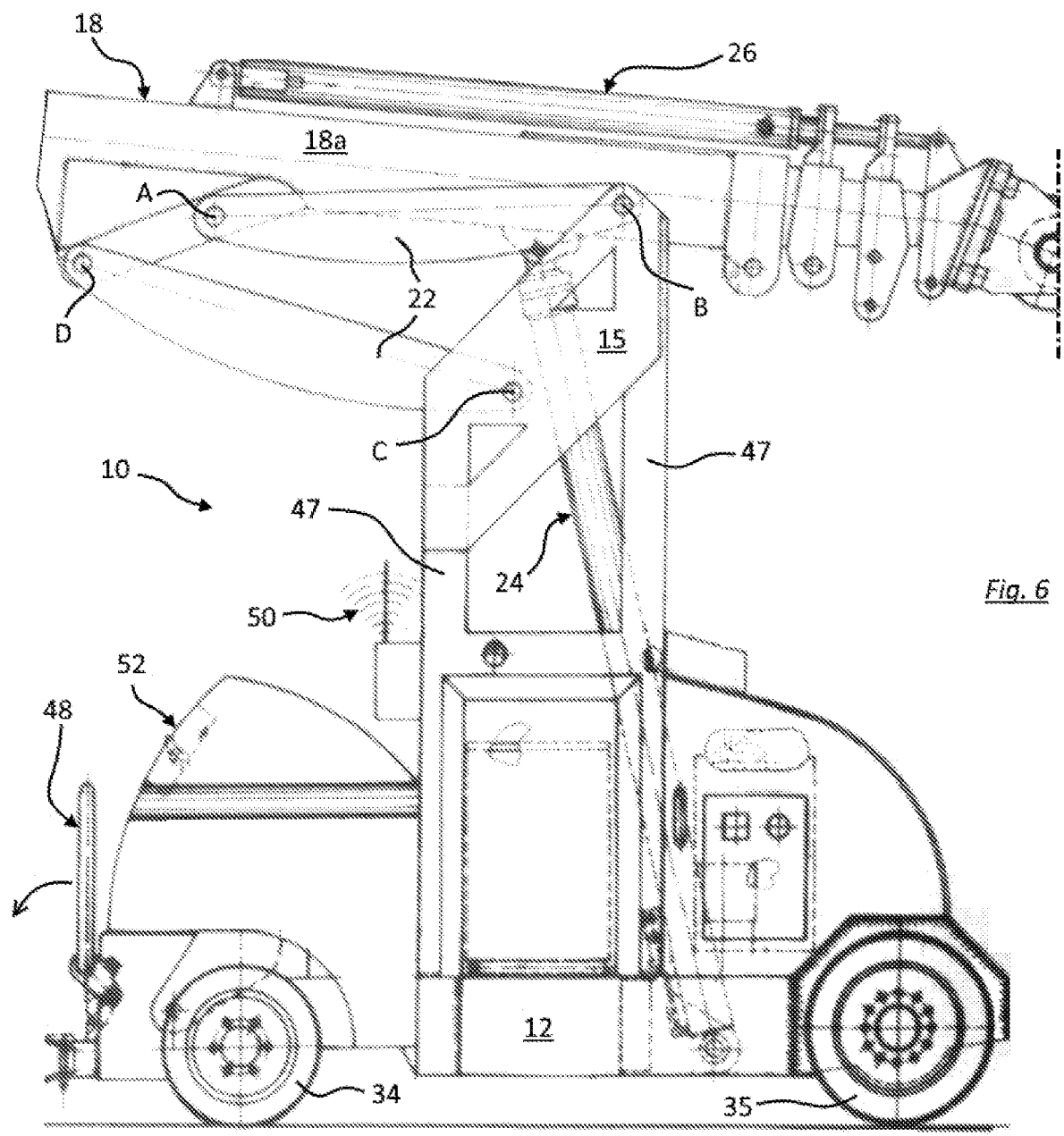
FIG. 6 is a side view of a crane according to a further variant of the invention.

With reference to the further variant shown, by way of non-limiting example, in FIG. 6, the crane is similar to the crane of FIG. 2, as a matter of fact the same numbers of FIG. 2 indicate corresponding elements, which are not repeated only for the sake of brevity. The crane of FIG. 6 is not provided with a rotary turret (indicated with 14 in FIG. 2) and, hence, arm 18, conveniently a telescopic arm, is not capable of rotating relative to base frame 12 around a substantially vertical axis. In the example, brackets 15 are fixed (e.g. welded) to support columns 47, which are integral to base frame 12. Therefore, in order to rotate arm 18, crane 10 needs to be rotated on the ground by steering wheels 34. Crane 10 of the example comprises a steering system of the type described above with reference to FIGS. 3-5. Hence, Crane 10 shown herein is simple, economic and compact. The preferred steering system allows the crane to rotate with a minimum steering radius, hence the crane is also agile in its movements.

The crane preferably has a movable platform 48, for accommodating a user and it is capable of assuming a retracted position, in which the space taken up by the crane is very small. In particular, movable platform 48 can rotate, conveniently around a horizontal axis; therefore, movable crane 48, when in the retracted position, is in a lifted position, in particular in a substantially vertical position shown in FIG. 6. The crane has a remote control system (for example, an antenna 50 is shown), with which a user can control the movements of the crane, for example it is possible to control the movements of the crane on the support surface and the movements of arm 18. When the user uses the remote control system, movable platform 48 is in the retracted position, thus minimizing the space taken up by the crane. When, on the other hand, the user decides to manually act upon the control of the crane (conveniently, by means of a control board 52), he moves movable platform 48 to an extracted position (conveniently, a horizontal position) and then he steps onto movable platform 48 to use the controls of the crane.

Movable platform 48 preferably comprises sensors to detect the presence of or the contact with objects close to movable platform 48. This allows users to avoid undesired hits during the movement of the crane, when movable platform 48 is extracted. In particular, movable platform 48 comprises contact sensors placed on its edge, when it 48 is in the extracted position.

Preferably, when movable platform 48 is in the retracted position, users cannot manually act upon the controls of the crane, in particular upon control board 52, and they can control the crane only in remote mode. Hence, in order to use the controls to control the crane, users have to move the board to the extracted position (in the example, in a horizontal position). This feature is particularly safe because it prevents users from being hit by the crane when they act upon control board 52. On the other hand, when a user is standing on movable platform 48, he cannot be hit by the crane.

Naturally, the principle of the invention being set forth, embodiments and implementation details can be widely changed relative to what described above and shown in the drawings as a mere way of non-limiting example, without in this way going beyond the scope of protection provided by the accompanying claims.

The invention claimed is:

1. A crane for lifting and transporting loads comprising: a base frame, for transferring the loads of the crane onto a support surface by a plurality of wheels comprising two steering wheels; and a steering system;
   wherein the steering system comprises a linear steering actuator, which is directly hinged, on one side, to the base frame and, directly hinged on an other side, to a bar having two ends, wherein each end of the bar is hinged to a respective rotary element around a respective hinging axis, wherein each rotary element rotates around a respective rotation axis and is constrained in rotation to the respective steering wheel to steer the respective steering wheel;
   wherein rotational axes of the steering wheels are non-parallel to one another when the steering wheels are in a steered position.

2. A crane according to claim 1, wherein each steering wheel is integral to a respective toothed gear, which meshes with a toothed surface on the respective rotary element.

3. A crane according to claim 1, wherein each rotary element comprises a disc, or a semi-disc, or a toothed gear.

4. A crane according to claim 1, wherein a distance between the two hinging axes of the bar is smaller than a distance between the rotation axes of the rotary elements.

5. A crane according to claim 4, wherein the distance between the rotation axes of the rotary elements is smaller than a distance between steering axes of the steering wheels.

6. A crane according to claim 4, wherein at least one wheel is rotatable relative to said base frame to change a camber angle of said wheel.

7. A crane according to claim 1, wherein the linear steering actuator is hinged to a bracket, which is rigidly fixed to the bar, and the ends of the bar are hinged to two brackets, each bracket being rigidly fixed to the respective rotary element.

8. A crane according to claim 1, wherein each rotary element is a disc, and the bar is hinged to said disc proximate a circumference of said disc.

9. A crane according to claim 1, comprising a telescopic arm for lifting and transporting loads.

10. A crane according to claim 9, wherein the arm is rotatable around a vertical axis relative to said base frame.

* * * * *